United States Patent [19]

Von Bodungen et al.

[11] 4,450,260

[45] May 22, 1984

[54] EMULSION POLYMERIZATION

[75] Inventors: George A. Von Bodungen; Rudy F. Karg, both of Baton Rouge, La.

[73] Assignee: Copolymer Rubber & Chemical Corp., Baton Rouge, La.

[21] Appl. No.: 464,706

[22] Filed: Feb. 7, 1983

[51] Int. Cl.$^3$ ............................................. C08F 2/26
[52] U.S. Cl. ................................... 526/213; 524/285; 526/340; 526/338; 526/342
[58] Field of Search ........................ 526/213; 524/285

[56] References Cited

U.S. PATENT DOCUMENTS

| | | | |
|---|---|---|---|
| 2,980,653 | 4/1961 | Johnson | 526/213 |
| 3,179,613 | 4/1965 | Guenther et al. | 526/213 |
| 3,822,230 | 7/1974 | Nelson | 524/285 |
| 3,926,893 | 12/1975 | Woodward | 524/285 |

FOREIGN PATENT DOCUMENTS 57044609  3/1982  Japan .................................. 526/213

*Primary Examiner*—Joseph L. Schofer
*Assistant Examiner*—Peter F. Kulkosky
*Attorney, Agent, or Firm*—McDougall, Hersh & Scott

[57] ABSTRACT

A process for the emulsion polymerization of one or more polymerizable monomers wherein the emulsion polymerization is carried out in the presence of an emulsifier in the form of a diacid of a cyclic alkane or alkene. Emulsifiers of that type have been found to provide improved latex stability, improved bloom and improved processability of the resulting polymer.

21 Claims, No Drawings

EMULSION POLYMERIZATION

This invention relates to emulsion polymerization, and more particularly to emulsion polymerization in the preparation of rubbery polymers.

Emuslion polymerization in the preparation of, for example, rubbery polymers is well known. Typically, the momomers to be polymerized, usually butadiene alone or in combination with other comonomers, are emulsified using a variety of emulsifiers, including acid emulsifiers and rosin acid emulsifiers. After the desired degree of conversion is reached, the latex is congulated using a variety of conventional congulating agents, and the rubbery polymer recovered.

The rubbery polymer thus recovered is frequently subjected to what is known in the art as compounding, that is the rubbery polymer is mixed with fillers, plasticizers and other conventional additives on a rubber mill or other intensive mixer. It has been found that the mill processability of the rubbery polymer produced can be related to the emulsifier used in the emulsion polymerization operation. Poor mill processsbility can result in poor curative dispersions, increased mixing time and increased manpower for mill mixing operations.

It is accordingly an object of the present invention to provide a process for the emulsion polymerization of one or more monomers to produce polymers.

It is a more specific object of the invention to provide a process for emulsion polymerization to produce rubbery polymers utilizing new emulsifiers which impart improved properties to the latex thus produced.

It is yet another object of the invention to provide a process for emulsion polymerization in the preparation of rubbery polymers wherein the rubber has improved properties, including mill processability and improved bloom.

The concepts of the present invention reside in a process for emulsion polymerization of at least one ethylenically unsaturated monomer wherein the emulsion polymerization is carried out in the presence of an emulsifier of a diacid of a cyclic alkane or alkene. It has been found that the emulsifiers employed in the practice of this invention provide improved latex stability. In addition, rubber polymers produced according to the present invention exhibit reduced bloom or mold fouling tendencies on compounding as well as improved processability, particularly when the latex is coagulated using alum. That effect is demonstrated in the table following Example 4, comparing the diacid emulsifiers of this invention with conventional emulsifiers of the prior art.

The diacid cycloaliphatic emulsifiers employed in the practice of this invention are preferably cycloalkenes and cycloalkanes containing a carboxy group and a fatty acid group bonded thereto, the fatty acid group containing 1–25 carbon atoms. In the preferred form of the invention, the emulsifiers employed in the practice of this invention have the structural formula:

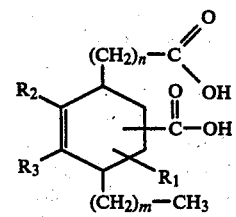

wherein n is an integer from 1 to 25, m is 0 or an integer from 1 to 25 and each of $R_1$, $R_2$ and $R_3$ is selected from the group consisting of hydrogen and $C_1$ to $C_{25}$ alkyl, and their salts.

Also suitable are the corresponding cyclohexane compounds which have the following structure:

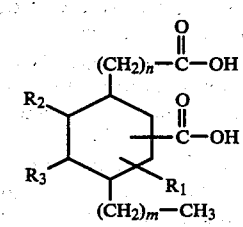

Particularly preferred among the emulsifiers employed in the practice of the present invention are 6-carboxy-4-hexyl-2-cyclohexene-1-octanoic acid, 5-carboxy-4-hexyl-2-cyclohexene-1-octanoic acid and mixtures thereof. The compounds of the foregoing type are prepared by reacting arcylic acid with a conjugated linoleic acid by way of Diels-Alder condensation reaction. The foregoing specific diacids are commercially available as a mixture of the two isomers under the trade name DIACID 1550 from Westvaco Corporation. Compounds fo the foregoing type are described in detail by Ward et. al. in "Industrial Utilization of $C_{21}$ Dicraboxylic Acid, " Journal of the American Oil Chemists' Society, Volume 52, No. 7, pp. 219-224.

The concepts of the present invention are applicable to the emulsion polymerization of a wide variety of polymerizable materials. In general, use can be made of one or more ethylenically unsaturated polymerizable monomers. Preferred are those monomers conventionally used in the preparation of rubbery polymers, particularly synythetic rubbers. Typical examples of such monomers are conjugated dienes alone or in combination with various vinyl monomers. For example, use can be made of 1,3-butadiene, 2-methyl-1,3-butadiene, 1,3-piperylene and 2,3-dimethyl-1,3-butadiene. Frequently, the conjugated dienes described above are used with another polymerizable vinyl monomer, including aryl olefins such as styrene and vinyl napthalene, carboxylic acids and their esters, nitriles and amides, such as acrylic acid, methylacrylate, methyl methacrylate, acrylonitrile, methacrylonitrile, methacrylamide. Other vinyl monomers, such as isobutylene, methylvinyl ether, methylvinyl ketone, vinyl pyridine and the like, may also be used. The emulsifiers employed in the practice of this invention have been found to be particularly effective in the emulsion polymerization of styrene-butadiene rubbery polymers, butadiene acrylonitrile rubbery polymers and styrene acrylonitrile polymers.

The amount of the emulsifier employed in the practice of this invention is not critical and can be varied within relatively wide ranges. Generally, the amount of the diacid emulsifier employed is an amount sufficient to emulsify the reaction mixtures, and generally ranges from 1–10 parts of the emulsifier per 100 parts of the monomer or monomers employed. It has been found that good results are obtained with 2–5 parts of emulsifier per 100 parts of monomer when the monomer is a combination of butadiene and acrylonitrile, butadiene and styrene and styrene and acrylonitrile.

While the emulsifier can be used in the form of the free acid, it is also possible, and sometimes desirable, to employ the emulsifier in the form of either the monocarboxylic or diacarbyoxylic acid salt. The most common salts employed are salts wherein the cation is sodium, potassium or ammonium, although it is understood that various other metal salts such as the alkaline earth metal salts can likewise be used.

As will be appreciated by those skilled in the art, various other conventional additives such as activators, antioxidants and the like can also be formulated in the emulsion. The free radical polymerization process, including the reaction conditions by which it is carried out, is conventional and is described in, for example, U.S. Pat. Nos. 3,055,856, 3,079,360, and 3,092,603.

Having described the basic concepts of the invention, reference is now made to the following examples, which are provided by way of illustration and not by way of limitation, of the practice of the invention.

EXAMPLE 1

This example illustrates the use of a diacid emulsifier according to the present invention.

A soap is made up by mixing 2.92 parts by weight of Westvaco Diacid 1500 and 0.90 parts by weight potassium hydroxide, and adjusting the pH to 10.4 to 10.6.

The soap is then formulated into the following emulsion:

| Component | Parts |
|---|---|
| Butadiene | 67 |
| Acrylonitrile | 33 |
| Diacid 1550 soap | 3.5 |
| Water | 200 |
| Peroxide catalyst (PMHP* (50%)) | 0.07 |
| C$_{12}$ Mercaptan | (0.3–0.6) |
| Sodium formaldehyde sulfoxylate | 0.075 |
| KCl | 0.3 |
| Sodium salt of polymerization alkyl naphthalein sulfonic acid (Lomar LS) | 0.10 |
| Activator (FeSO$_4$) | 0.30 |
| Versene 100 (Sodium EDTA) | 0.02 |
| Sodium hydrosulfite | 0.02 |
| Sodium dodecyl dithio carbamate | 0.02 |
| Diethyl hydroxyl amine | 0.02 |

*PMHP—paramethane hydroperoxide

The polymerization reaction is then carried out in a conventional manner to the desired degree of conversion, typically 75 to 90% conversion. It has been found that the conversion of the polymerization reaction can be varied over wide limits; for example, conversions of butadiene and acrylonitrile copolymers have been carried to about 97% conversion with no adverse effect on latex stability.

After the desired degree of conversion is reached, the rubbery polymer is recovered by coagulating the latex. In the preferred practice of this invention, the rubbery polymer latex is coagulated with alum to provide a rubbery polmyer having improved mill processability as compared to those rubbery polymers coagulated by acid. Evaluating mill processability on a subjective scale of 1 to 10 (1 referring to worst mill processability and 10 referring to the best), the following results were obtained.

For a polymerization according to the recipe shown above except that 4.0 parts of Diacid 1500 were used, a conversion of 75% was reached. Coagulation of a sample of the latex with isopropyl alcohol produced a polymer which when tested by infrared spectroscopy proved to be essentially free of both Diacid and its metal salts. Analysis of the alcohol serum used for the coagulation showed an amount of Diacid 1550 equal to 4.477% of the oirginal polymer and a further amount of dipotassium soap of the Diacid equal to 0.80% of the original polymer. The total was in good agreement with the 5.3% Diacid expected from a calculation based on the 4.0 part charge and 75% conversion.

TABLE I
Mill Processibility Ratings for Nitrile Polymers

| Sample | Emulsifier | Coagulant | Mill Rating (1–10) |
|---|---|---|---|
| A | Diacid | Alum | 8 |
| B | Diacid | Alum | 9 |
| Control | 75 fatty acid/ rosin acid | Alum | 1 |

EXAMPLE 2

Using the procedure described in Example 1, a butadiene-styrene emulsion for use in the preparation of SBR is formulated as follows:

| Component | Parts |
|---|---|
| Butadiene | 52 |
| Styrene | 48 |
| Diacid soap | 4.5 |
| Water | 200 |
| PMHP | 0.07 |
| C$_{12}$ Modifier | (.06–.12) |
| Sodium formaldehyde sulfoxylate | 0.075 |
| KCl | 0.3 |
| Lomar LS | 0.20 |
| Activator (FeSO$_4$) | 0.90 |
| Versene 100 | 0.02 |
| Sodium hydrosulfite | 0.02 |
| Sodium dimethyl dithio carbamate | 0.075 |
| Diethyl hydroxyl amine | 0.075 |

EXAMPLE 3

Using the procedure described in Example 1, a styrene-acrylonitrile emulsion is prepared as follows:

| Component | Parts |
|---|---|
| Styrene | 72 |
| Acrylonitrile | 28 |
| Diacid soap | 3.5 |
| Water | 200 |
| PMHP | 0.08 |
| C$_{12}$ Modifier | 0.07 |
| Sodium formaldehyde sulfoxylate | 0.075 |
| KCl | 0.30 |
| Lomar LS | 0.10 |
| Activator (FeSO$_4$) | 0.005 |
| Sodium hydrosulfite | 0.05 |
| Versene 100 | 0.02 |
| Dimethyl hydroxyl amine | 0.075 |

EXAMPLE 4

This example sets forth latex mechanical instability data of polymers produced in accordance with the present invention using the diacid emulsifier as compared to fatty acid and/or rosin emulsifiers of the prior art. The mechanical index (MI) is measured as percent coagulum formed after working a known quantity of latex in a mechanical blender for 5 minutes.

In each case, a polymer is prepared using the monomers specified and the emulsifiers specified. The resulting polymer is then coagulated and the mechanical instability determined.

The results of the mechanical instability tests are as follows:

| Sample ID | Monomer Combination (w/w) | Emulsifier | Conversion % | MI (%) |
|---|---|---|---|---|
| A1 | Styrene/Butadiene (40/60) | Diacid | 80 | .14 |
| A2 | Styrene/Butadiene (40/60) | Diacid | 82 | .09 |
| A3 | Styrene/Butadiene (40/60) | Rosin acid | 80 | 4.2 |
| A4 | Styrene/Butadiene (40/60) | Rosin acid | 87 | 2.2 |
| A5 | Styrene/Butadiene (40/60) | 70 Fatty acid/ 30 rosin acid | 78 | 1.1 |
| B2 | Butadiene/Acrylonitrile (67/33) | 60 Fatty acid/ 40 rosin acid | 79 | 3.2 |
| B3 | Butadiene/Acrylonitrile (67/33) | 75 Fatty acid/ 25 rosin acid | 80 | 5.9 |
| B1 | Butadiene/Acrylonitrile (67/33) | Diacid | 88 | 0.002 |
| B4 | Butadiene/Acrylonitrile (67/33) | Lomar*/Rosin | 89 | 0.5 |
| B5 | Butadiene/Acrylonitrile (67/33) | Lomar/Fatty acid | 81 | 0.2 |
| C2 | Styrene/Acrylonitrile (75/25) | 60 Fatty acid/ 40 rosin acid | 90 | High |
| C3 | Styrene/Acrylonitrile (75/25) | 75 Fatty acid/ 25 rosin acid | 90 | High |
| C1 | Styrene/Acrylonitrile (75/25) | Diacid | 92 | 0.6 |
| C4 | Styrene/Acrylonitrile (75/25) | Lomar/Rosin | 90 | High |
| C5 | Styrene/Acrylonitrile (75/25) | Rosin | 87 | High |
| B1 and C1 blend | | | | 0.02 |

*Lomar-sodium salt of polymerized alkyl naphthalene sulfonic acid.

As can be seen from the foregoing test data, the latices produced with the diacid emulsifier of the present invention exhibit considerably lower mechanical instability as compared to those produced from fatty acid and rosin acid emulsifiers of the prior art.

The concepts of the present invention, while exemplified in the preparation of rubbery polymers, can be used generally in elmusion polymerization. The concepts can be used in emulsion polymerization of one or more vinyl monomers to produce thermoplastic or thermosetting polymers.

It will be understood that various changes in the details of procedure, formulation and use may be made without departing from the spirit of the invention, especially as defined in the following claims.

We claim:

1. In a process for the emulsion polymerization of at least one monomer, the improvement comprising carrying out the emulsion polymerization in the presence of an emulsifier of a diacid derivative of a cyclic or alkene selected from the group consisting of a compound or its salt having the structure:

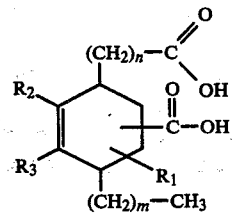

and a compound or its salt having the structure:

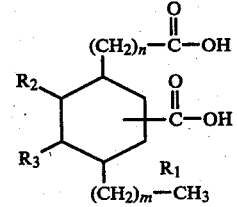

wherein n is an integer from 1 to 25, m is 0 or an integer from 1 to 25 and each of $R_1$, $R_2$ and $R_3$ is selected from the group consisting of hydrogen and $C_1$ to $C_{25}$ alkyl.

2. A process as defined in claim 1 wherein the emulsifier is present in an amount within the range of 1 to 10 parts by weight per hundred parts by weight monomer.

3. A process as defined in claim 1 wherein the emulsifier is a carboxy-4-hexyl-2-cyclohexene-1-octanoic acid.

4. A process as defined in claim 1 wherein the monomer includes a conjugated diene.

5. A process as defined in claim 1 wherein the monomer is butadiene and styrene.

6. A process as defined in claim 1 wherein the monomer is butadiene and acrylonitrile.

7. A process as defined in claim 1 wherein the monomer is styrene and acrylonitrile.

8. In a process for the emulsion polymerization of at least one monomer in the preparation of a rubbery polymer, the improvement comprising carrying out the emulsion polymerization in the presence of an emulsifier in the form of a diacid derative of cyclo aliphatic compound selected from the group consisting of a cylco hexene and a cyclo hexane, said derivative containing a carboxy group and a fatty acid group bonded directly to the ring.

9. A process as defined in claim 8 wherein the emulsifier has a structure:

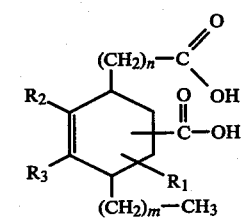

or salts of the same structure wherein n is an integer from 1 to 25, m is 0 or an integer from 1 to 25 and each of $R_1$, $R_2$ and $R_3$ is selected from the group consisting of hydrogen and $C_1$ to $C_{25}$ alkyl.

10. A process as defined in claim 8 wherein the emulsifier is present in an amount within the range of 1 to 10 parts by weight per hundred parts by weight monomer.

11. A process as defined in claim 8 wherein the emulsifier is a carboxy-4-hexyl-2-cyclohexene-1-octanoic acid.

12. A process as defined in claim 8 wherein the monomer includes a conjugated diene.

13. A process as defined in claim 12 wherein the monomer also includes at least one polymerizable vinyl monomer.

14. A process as defined in claim 8 wherein the monomer is selected from the group consisting of butadiene, butadiene and styrene, butadiene and acrylonitrile and styrene and acrylonitrile.

15. A composition comprising (a) a polymer produced from one or more vinyl monomers by emulsion polymerization and (b) an emulsifier, present during the emulsion polymerization, selected from the group or salts of the group consisting of

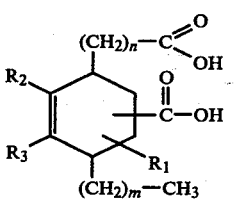

and

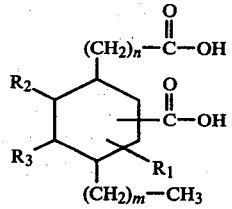

wherein n is an integer from 1 to 25, m is 0 or an integer from 1 to 25 each of $R_1$, $R_2$ and $R_3$ is selected from the group consisting of hydrogen and $C_1$ to $C_{25}$ alkyl.

16. A composition as defined in claim 15 wherein the emulsifier is present in an amount within the range of 1 to 10 parts by weight per hundred parts by weight monomer.

17. A composition as defined in claim 15 wherein the emulsifier is a carboxy-4-hexyl-2-cyclohexene-1-octanoic acid.

18. A composition as defined in claim 15 wherein the monomer includes a conjugated diene.

19. A composition as defined in claim 15 wherein the monomer is butadiene and styrene.

20. A composition as defined in claim 15 wherein the monomer is butadiene and acrylonitrile.

21. A composition as defined in claim 15 wherein the monomer is styrene and acrylonitrile.

* * * * *